INVENTOR.
LEONARD A. STENGEL

BY Merriam and Dibble
ATTORNEYS.

INVENTOR.
LEONARD A. STENGEL

3,330,535
MIXING APPARATUS
Leonard A. Stengel, Terre Haute, Ind., assignor to Commercial Solvents Corporation
Filed Dec. 10, 1964, Ser. No. 417,314
5 Claims. (Cl. 259—4)

This invention relates to an apparatus for bringing into intimate contacts at least two fluids for the purpose of obtaining intimate dispersion or contact between the fluids. The fluids may comprise liquids, gases, mixtures of gases, mixtures of liquids, suspensions, or emulsions. The invention in particular may be applied in chemical reactions or processes when treating one liquid phase with at least one other liquid phase as in washing or extracting processes and when treating a gas phase with at least one liquid phase as in distillation, scrubbing, absorption, stripping, evaporation and humidification processes.

It s an object of this invention to provide an improved apparatus for contacting two fluids by passing the fluids through a contact zone which is provided with means for preventing or reducing channeling, and for bringing the fluids into more intimate contact than has been possible with processes and apparatus used heretofore. It is a further object of this invention to provide an apparatus having increased effectiveness, high capacity, low pressure drop, low power requirements, and great flexibility with respect to the flow rates and the physical properties of the fluid phases. Other objects of this invention will be apparent from a reading of the specification.

It has been proposed to contact liquids, or a liquid and a gas, in a countercurrent manner by introducing them into a column or tower provided with contact means such as Raschig rings, packing, etc. The disadvantage of most such installations however, is that one of the fluids flows upwardly in small streams in certain parts of the tower, thereby preventing effective contact between them. It has also been proposed to contact the fluids by means of fixed plates provided with means through which the fluids flow, e.g. bubble cap plates, sieve plates, etc. However, the use of such means requires the expenditure of relatively large amounts of power for pumping the fluids and also allows very little variation in flow rate from that for which the columns were originally designed.

It has now been found that the above disadvantages can be avoided and more intimate contact can be obtained by flowing the fluids through a vessel provided with perforated plates mounted on a shaft and having a close clearance at the walls of the vessel and immersed in the fluids, means for interconnecting the two ends of the vessel above and below said plates and means for reciprocating said shaft and the plates supported in said vessel by the shaft. Very violent and intimate mixing occurs due to the perforations in the plates.

By imparting a reciprocating motion to the perforated plates which contain a multiplicity of orifice-like holes spaced throughout the plate and by immersing the reciprocating perforated plates in the fluids, intimate contact of the fluids is accomplished by the multiplicity of jets or streams which will flow out of each hole on both the up and down strokes of the plates during reciprocation. On the downstroke, the liquid under the plate will be displaced by the solid area of the plate and must flow either through the holes in the form of jets, the means interconnecting the two ends of the vessel or around the periphery of the perforated plate. On the upstroke the liquid above the plate is displaced by the solid area of the plate and must flow either through the holes in the form of jets, the means interconnecting the two ends of the vessel or around the periphery of the perforated plate. In the case of a liquid and gas phase operation, for example, the gas phase is continually being pumped from the top to the bottom of the vessel on the up-stroke of the shaft down through the means interconnecting the two ends of the vessel, and then upward through the holes in the plates as the perforated plates move up and down. Also, the liquid phase at the bottom of the vessel is continually being pumped from the bottom to the top of the vessel on the downstroke of the shaft through the means interconnecting the two ends of the vessel and then back to the bottom of the vessel through the holes in the plates as these perforated plates move up and down.

The fluids are maintained in the region of the perforated plates for a sufficient length of time to cause the desired intimate contact which will be determined by the number of plates, size of the vessel, etc. Since the energy of mixing is provided by the plate, the resistance to flow or pressure drop through the zone in which the perforated plate is acting is much less than the pressure drop through the usual fixed orifice plate.

The amount of mixing obtained with the device of the present invention depends upon the relative quantities of the fluids displaced by the plates, the velocities of the jets issuing from the holes, the distances the jets flow and other factors. The relative quantities of the liquid displaced by the solid area of the plate which go through the orifice-like holes, through the means interconnecting the two ends of the vessel or around the periphery of the plate depend upon the relative resistances to flow of the two flow paths. Thus, the greater the resistance to flow around the periphery of the plates, i.e. the closer the clearance between the plates and the vessel walls, the larger the fraction of the displaced liquid which flows through the holes and the means interconnecting the two ends of the vessel. Conversely, the greater the resistance to flow through the holes in the plate, the larger the fraction of the displaced liquid which flows around the periphery of the plates.

The velocities of the streams or jets issuing from the holes and the distances that the streams or jets flow before they lose their kinetic energy depend upon such factors as the frequency and amplitude of the reciprocating motion of the plate; the ratio of the solid area around each hole to the hole area; the total resistance to flow offered by the hole; and the total resistance to flow around the periphery of the plate. If the holes are very large with respect to the solid area between them there will be insufficient solid area per unit of hole area to displace liquid and the streams or jets issuing from the holes will have very low velocities and very low penetration distances. Conversely, if the area between holes is very large with respect to the area of the hole, the streams or jets will have high velocities and penetrating power but there will be a much smaller percentage of the displaced liquid flowing through the holes. The shape of the holes in the plates also has some effect on the type of stream coming through the holes, but the effect of cross-sectional area of the perforation is generally more important to degree of mixing than the shape of the hole. Thus, the holes may be round or slot-like, tapered or conical, or in the form of nozzles. Since conical holes produce very much stronger jets from the side of the hole with the smaller diameter than from the side with the larger diameter, it is also possible to construct perforated plates which produce strong jets on only one side. The distance that the streams or jets travel before they lose their kinetic energy is very important, because the degree of mixing for this type of mixer depends upon the jets of one phase maintaining sufficient kinetic energy to agitate the other phase. This distance of travel of the jets should be about 3 or 4 times, or more, the diameter of the holes from which the jets issue.

For practical purposes, it has been found that the frequency of the reciprocating motion of the shaft can be from about 30 to 1000 cycles per minute, the hole diameters for round holes may be from about $\frac{1}{32}$-inch to about 2 inches, and the ratio of hole area to solid area may be from about 5 to 50% open area. The proper choice of these variables allows the penetration distances of the streams to be varied from less than 1 inch to more than 1 foot.

Certain preferred details of construction together with additional objects and advantages will become apparent and the invention itself will be best understood by reference to the accompanying drawings wherein.

Figure 1:
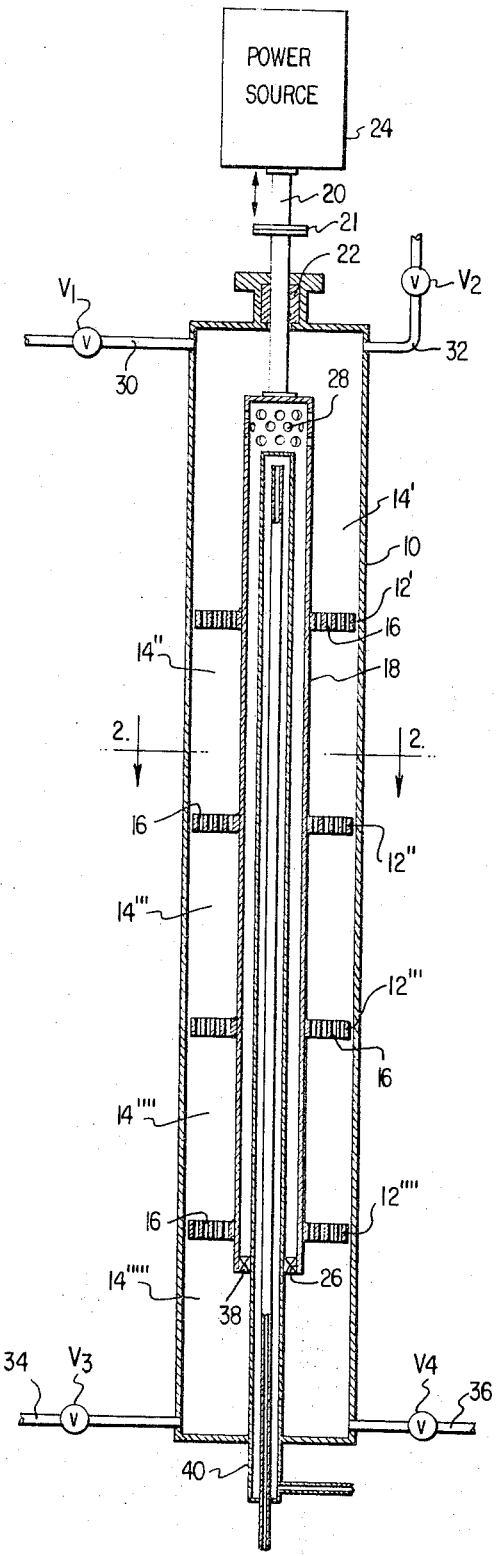
FIGURE 1 illustrates a preferred form of the invention.
Figure 2:
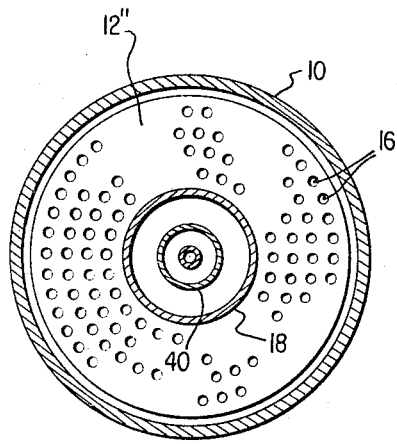
FIGURE 2 is a cross-sectional view of FIGURE 1 taken along line 2—2 of FIGURE 1.

Referring to FIGURE 1, a tower or vessel 10 is provided with a plurality of plates 12 which divide the vessel into several stages 14 of intense mixing. Although four plates 12', 12'', 12''' and 12'''' are illustrated, forming five stages 14', 14'', 14''', 14'''' and 14''''', any number of plates and mixing stages can be used so as to provide sufficient mixing of the fluids. Suitable perforations or holes 16 in each of the plates 12 facilitate the mixing as described hereinabove. Plates 12 are rigidly connected, e.g. welded, bolted, etc., to a hollow shaft 18 arranged in the vessel 10, which is, in turn, connected at its upper end to drive shaft 20 which passes through a bearing and packing arrangement 22 at the upper end of the vessel 10 and which is driven by power source 24. Element 21 is a check limiting movement of shaft 20 into vessel 10. Power source 24 can be any conventional power means for supplying reciprocating movement to the drive shaft, and consequently both the hollow shaft and the perforated plates attached thereto, such as a hydraulic piston-cylinder, a solenoid or a motor driven cam arrangement. Preferably such power sources are variable as to the strokes per minute and length of strokes so that the frequency and amplitude of the reciprocating movement of the plates can be varied. The hollow shaft 18 is provided with an entry port 26 at the bottom thereof beneath the lowermost plate 12'''' in stage 14''''' and with ports 28 above the uppermost plate 12' in stage 14'. Of course, additional inlets to shaft 18 may be provided, if desired, for pumping from another mixing stage 14 such as stage 14'', 14''' or 14''''. The vessel 10 is further provided with inlet and outlet means for the fluids which are to be intimately contacted in the vessel. Such means include, for example, conduits 30, 32, 34 and 36 and corresponding valves V1, V2, V3 and V4 which may be arranged for concurrent flow, countercurrent flow, batch operation, etc., and may include additional openings and outlets if more than two fluids are to be mixed in the apparatus. If batch flow is desired, only a single inlet and outlet may be required.

In use, considering intimate contacting of a liquid and gas, gas may be introduced into vessel 10 through line 30 and liquid through line 32. The liquid will initially flow downward through the holes 16 in the plates 12 and around the plates 12 to the desired level. After the vessel has been filled, power source 24 is activated to drive the shaft 18 in a reciprocating movement through drive shaft 20. The liquid below and in contact with the solid portion of each plate 12 is displaced during the downstroke of shaft 18 with the result that it is forced upwardly through holes 16 in plates 12 in the form of jets which travel a considerable distance. These jets thoroughly mix material in the vicinity of the top of each plate 12. Furthermore, during the downstroke of shaft 18, the liquid at the bottom of vessel 10 is pumped to the top of vessel 10 through hollow shaft 18 from the bottom opening 26 to top openings 28. On the upstroke of shaft 18, each perforated plate 12 displaces the liquid above it and forces the same downwardly through the holes 16 to mix with the liquid beneath it. Simultaneously, the material, e.g. gas at the top of the vessel is forced through openings 28, hollow shaft 18 and opening 26 to the bottom of vessel 10. Accordingly, the gas phase is continually being pumped from the top mixing stage 14' of vessel 10 to the bottom mixing stage 14''''' on the upstroke of shaft 18 and is then upwardly moved through the holes 16 in plates 12 through mixing stages 14'''', 14''' and 14'' back to stage 14' during the downstroke of shaft 18. Simultaneously the liquid phase at the bottom of the vessel is continuously being pumped from mixing stage 14''''' up through shaft 18 to the top mixing stage 14' on the downstroke of shaft 18 and then back to mixing stage 14''''' through mixing stages 14'', 14''' and 14'''' during the upstroke of shaft 18. Very violent and intimate mixing of the liquid and gas phase occurs in vessel 10 due to these pumping actions, through the turbulence created by the jets formed as discussed above.

For continuous operation of vessel 10, check valve 38 can be installed in hollow shaft 18 to permit pumping of the contents at the top of vessel 10, i.e. gas to the bottom of the vessel and prevent the bottom contents, i.e. liquid from being pumped to the top. By this means fresh liquid can be added to the top of the vessel through inlet 32 and liquid withdrawn from the vessel through outlet 34. Alternatively, valve V3 in outlet 34 can be a spring loaded valve and the pressure required to open this valve adjusted with respect to the pressure produced by the downstroke of shaft 18 so that pumping through the shaft 18 will occur simultaneously with withdrawal of material through outlet 34. Valves V1, V2, V3 and V4 can also be arranged in a similar manner with respect to the pressure produced during the up and down strokes of shaft 18 so that the vessel 10 may be used to countercurrent operation.

Hollow shaft 18 can be provided with a heat exchange bayonet 40 as shown so that the material being pumped through the hollow shaft can be heated or cooled as desired. Such a bayonet is desirable for controlling exothermic or endothermic reactions. If desired, vessel 10 can also be provided with a jacket for cooling or heating.

Figure 3:
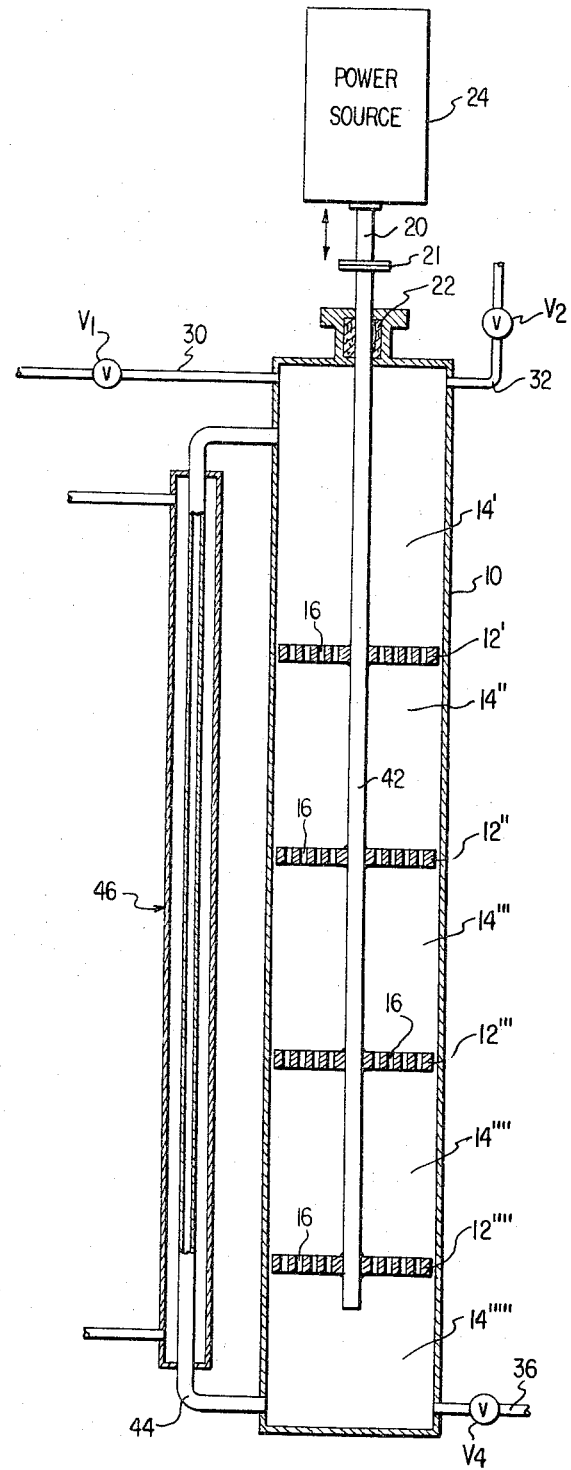
FIGURE 3 illustrates a modified embodiment of the invention.

FIGURE 3 illustrates a modification in the above described apparatus wherein a solid shaft 42 replaces the hollow shaft 18 and an exterior conduit 44 interconnects the top and bottom of vessel 10. Of course, if desired, both a hollow shaft and an exterior conduit can be provided. Heat exchanger 46 is provided around conduit 44 so that the material being pumped through conduit 44 can be heated or cooled as desired, for instance to control endothermic and exothermic reactions.

The following examples illustrate the usefulness of the apparatus discussed above without limiting the same.

*Example I*

In the apparatus shown in FIGURE 1, omitting valve 38, tris(hydroxymethyl)nitromethane was reduced to tris(hydroxymethyl)aminomethane using a Raney nickel catalyst at room temperature and 3 p.s.i.g. hydrogen.

*Example II*

In the apparatus shown in FIGURE 1, omitting bayonet heat exchanger 40, cyclohexane was nitrated with 56% nitric acid at 4 p.s.i.g. Reaction started at 25° C.

*Example III*

In the apparatus shown in FIGURE 3 nitric oxide was reduced with hydrogen at 5 p.s.i.g. and 30° C. by using a liquid phase consisting of 500 ml. water with 10 grams Raney nickel.

It can be seen by the above described invention there has been provided chemical apparatus which may be utilized to carry out various chemical processes, both endothermic and exothermic, under contorlled conditions in which thorough and complete mixing may be accomplished in order to facilitate such reactions and furthermore the apparatus may be conveniently manufactured in use in laboratories and thereafter duplicated to an enlarged scale for use in production. The apparatus is also suitable for high pressure operations.

It will be obvious to those skilled in the art that various changes may be made in the invention. The invention is not limited by that which is shown in the drawings and described in the specification but only as indicated in the appended claims.

It is claimed:

1. A mixing apparatus for contacting at least two fluids comprising in combination a chamber adapted to contain said fluids, a vertically moveable hollow shaft mounted in said chamber and having openings therein at the bottom and top of said chamber, at least one perforated plate fixed to said shaft and dividing said chamber into a plurality of mixing stages, fluid inlet means and fluid outlet means for said chamber, said hollow shaft constituting means interconnecting the bottom portion of said chamber with the top portion thereof and forming with said mixing stages a continuous flow path between the top and bottom of said chamber, and means for imparting vertically reciprocating motion to said shaft whereby said fluids are intimately mixed while being pumped along at least a portion of said flow path by the action of said plate.

2. A mixing apparatus as defined in claim 1 further including a bayonet heat exchanger extending into said hollow shaft from the bottom of said chamber.

3. A mixing apparatus as defined in claim 1 wherein said interconnecting means includes means of preventing flow of said fluids therethrough in one direction.

4. A mixing apparatus as defined in claim 1 wherein said power means includes means for adjusting the frequency and amplitude thereof.

5. A mixing apparatus as defined in claim 1 wherein there are a plurality of said perforated plates fixed to and vertically spaced along the shaft to divide the chamber into a plurality of mixing stages, said plates having close clearance with respect to the inside wall of the chamber

References Cited

UNITED STATES PATENTS

| 180,086 | 7/1876 | Wiswell | 259—98 |
| 504,174 | 8/1893 | Quigley | 259—113 |
| 2,626,889 | 1/1953 | Carney | 259—8 XR |
| 2,828,111 | 3/1958 | Messinger | 259—4 |

FOREIGN PATENTS

| 2,526 | 1/1911 | Great Britain. |
| 3,754 | 2/1912 | Great Britain. |

WALTER A. SCHEEL, *Primary Examiner.*

J. M. BELL, R. JENKINS, *Assistant Examiners.*